Dec. 9, 1930.                R. ABELL                1,784,409
                        ENGINE DRIVE MECHANISM
                         Filed Jan. 20, 1930
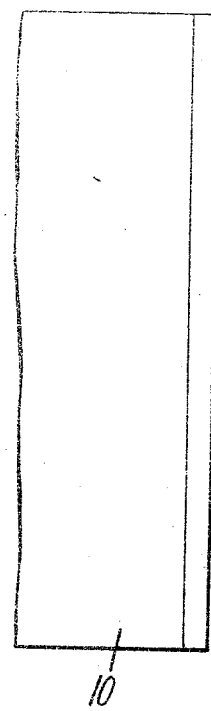
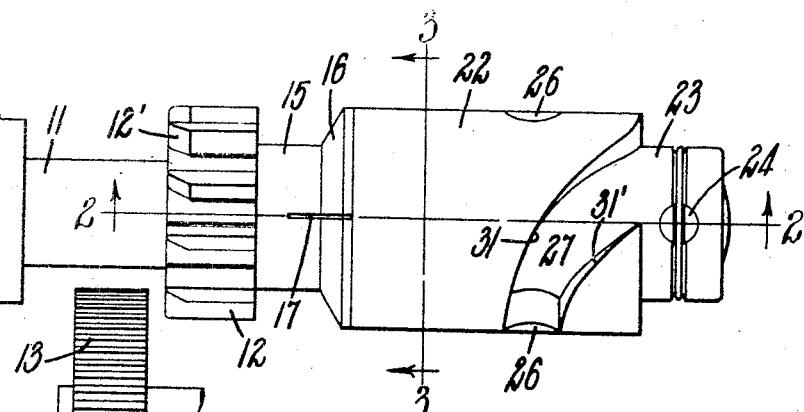
Fig.1.
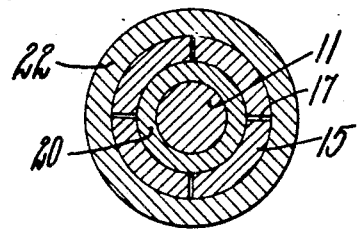
Fig.3.
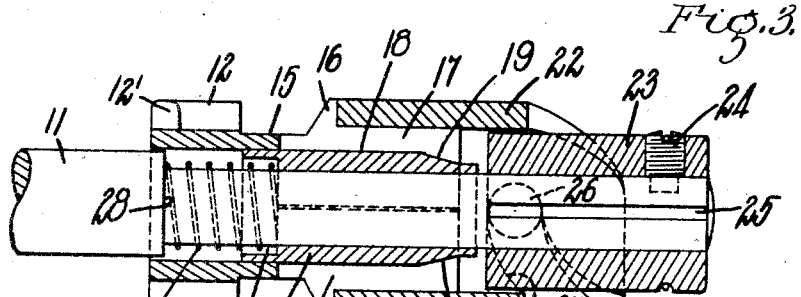
Fig.2.
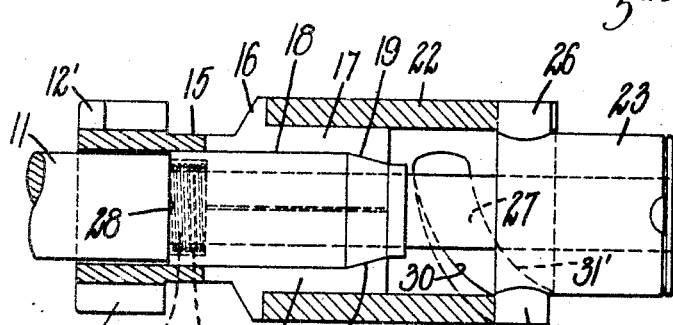
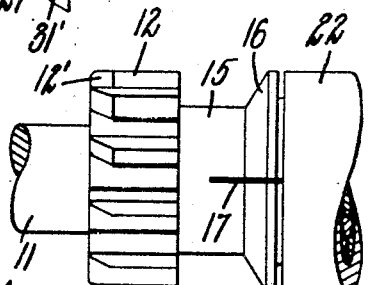
Fig.4.        Fig.5.
Inventor:
Rollin Abell.
by Charles S. Gooding.
                Atty.

Patented Dec. 9, 1930

1,784,409

UNITED STATES PATENT OFFICE

ROLLIN ABELL, OF MILTON, MASSACHUSETTS

ENGINE-DRIVE MECHANISM

Application filed January 20, 1930. Serial No. 421,958.

This invention relates to an engine drive mechanism particularly adapted to transmit motion from a driving shaft to a driven shaft such for example, as the driving shaft of a starting motor in an automobile and the flywheel and crank shaft of an internal combustion engine.

The engine drive mechanism of this invention embodies therein a cylindrical friction clutch comprising a pinion provided with a cylindrical hub split longitudinally thereof and a cam sleeve mounted on said hub and having frictional engagement therewith normally of slight amount and within the bore of said cylindrical hub is positioned an inner sleeve, tapered and constituting a wedge.

The object of this invention is to increase the life of the pinion and ring gear by preventing the chipping of the teeth of the ring gear or of the pinion during the interengagement of the teeth of the pinion with the teeth of the ring gear. To attain this object the pinion is so constructed and operated that when the teeth of the pinion abut against the teeth of the ring gear when shifting the pinion gear into mesh with the ring gear, at the instant when the pinion engages the edge of the fly-wheel gear the clutch will slip and when the pinion finally meshes with the fly wheel gear by sliding across the teeth and advancing to full mesh position, the clutch will operate to gradually increase the frictional resistance to slipping until it will hold the stall-torque of the motor, which on a Ford car is about 16 foot pounds.

The invention consists in an engine drive mechanism and in a friction clutch forming a part of said mechanism of the character set forth in the following specification and particularly as pointed out in the claims.

Referring to the drawings:

Figure 1 is a side elevation of a preferred form of my engine drive mechanism, portions of the same being broken away to save space.

Fig. 2 is a longitudinal sectional elevation taken on line 2—2, Fig. 1.

Fig. 3 is a transverse section taken on line 3—3, Fig. 1.

Fig. 4 is a sectional elevation similar to Fig. 2 illustrating the parts in diffeernt relative positions and taken on line 2—2, Fig. 1.

Fig. 5 is a view similar to Fig. 1 broken away.

Like numerals refer to like parts throughout the several views of the drawings.

Referring to Figs. 1, 2, 3 and 4 of the drawings, 10 is a portion of a starting motor such as is used in automobiles for starting the rotation of the engine crank shaft, and well known to those skilled in this art, and 11 is the starting motor shaft. 12 is a driving pinion which is slidably mounted on the shaft 11 and is operated by the mechanism hereinafter described to be moved longitudinally of the shaft 11 into engagement with an annular gear 13 which is positioned upon a body portion or fly-wheel 14. The pinion 12 has its teeth chamfered at 12′ in order to assist in the interengagement of the pinion teeth with the gear teeth and has a cylindrical hub 15 which is provided with an annular flange or shoulder 16 on its periphery and is split by a plurality of slots 17. The bore 18 of the split portion of the hub 15 is tapered at 19. The hub 15 is slidably mounted on an inner sleeve 20 which is slidably mounted on the shaft 11 and is tapered to form a conical portion 21 which engages the tapered portion 19 of the bore of the hub 15.

Surrounding the split portion of the hub 15 is an outer sleeve 22 and the split portion of the hub 15 at all times engages the bore of the outer sleeve 22 with a frictional engagement of predetermined capacity. The sleeve 22 fits the split portion of the hub 15 tightly enough so that it will slip or rotate upon the hub quite easily.

Another sleeve 23 is fastened to the extreme outer end of the driving shaft 11 by a set screw 24 and key 25. This sleeve has a pair of studs 26 projecting laterally therefrom on opposite sides thereof and these studs project into cam grooves 27 provided in the rear end of the outer cam sleeve 22. These studs perform a two-fold function. They move the sleeve 22, together with the hub 15 and its pinion 12 and the inner sleeve 20 longitudinally of the shaft 11 until the pinion is brought into engagement with the gear 13 of the fly-wheel 14 and they also impart a rotary movement to the pinion 12 and gear 13, fly-wheel 14 and the crank shaft to which it is attached, the crank shaft not being shown in the drawings, but well known to those skilled in this art.

The shaft 11 is provided with a shoulder 28 and the inner sleeve 20 is provided with a recess 29. A light spring 30 is interposed between the shoulder 28 and the bottom of the recess 29 to act only as an anti-rattler.

When the pinion 12 with its hub 15 and the outer sleeve 22 and the inner sleeve 20 have been moved toward the left, from the position illustrated in Fig. 2, until the teeth of the pinion 12 are in full mesh with the teeth of the gear 13, the parts are so proportioned and positioned relatively to each other that the left hand end of the inner sleeve 20, Fig. 2, will abut against the shoulder 28 and then a slight further pressure upon the outer sleeve 22 against the shoulder 16 will cause the split hub 15 to exert an increased pressure against the outer sleeve by reason of the conical portion 21 of the inner sleeve 20 bearing against the tapered portion 19 of the bore of the hub 15.

The general operation of the mechanism hereinbefore specifically and to some extent in general described is as follows:

Assuming the starter mechanism to be operated in the usual manner the starter shaft or drive shaft is rotated. This imparts rotation to the sleeve 23 with its laterally projecting studs 26. The studs engage the edge 31 of the cam 27 and drive the outer sleeve 22, hub 15, pinion 12 and inner sleeve 20 longitudinally of the shaft 11 until the pinion 12 engages the annular gear 13, and the said studs 26 also impart a rotary movement to the pinion 12 and the gear 13 by engaging the cam 27. When the pinion 12 engages the annular gear 13, if the teeth of the pinion and the gear abut, the teeth of the pinion will be pressed against the teeth of the gear with a light pressure and will rotate until they come into alignment with a space between the teeth of the gear when they will move into mesh with said teeth and when they are fully in mesh the left hand end of the inner sleeve 20, Fig. 2, will abut against the shoulder 28 on the shaft 11 as illustrated in Fig. 4 and at that time the split hub 15 will be caused to grip the outer sleeve 22 with greater friction.

When the gear 13, fly-wheel 14 and its crank shaft are rotating, the starter is stopped in the usual manner and the pinion 12 will be moved out of engagement with the gear 13 due to the fact that the pinion 12 will then be rotated by the gear 13, and the studs 26 being stationary, the outer sleeve 22, the pinion 12 and its hub 15 and the inner sleeve 20 will be forced toward the right, Fig. 2, by the engagement of the studs 26 with the side 31' of the cam 27.

It will be understood that a driving connection between the pinion and the outer sleeve, whereby the gear 13 can be driven, is only obtained when the pinion is fully engaged with the teeth of the gear 13. There are two stages to the meshing of the pinion with the gear 13, the first one often produces a tooth-butt which for an instant presses the pinion against the edge of the fly-wheel gear 13, and unless the starting motor is free to rotate and spend its inertia the teeth of the pinion and of the gear will be damaged by chipping. It is therefore desirable to have a moderate clutching action between the outer sleeve and the hub of the gear up to this point. The pinion 12 finally meshes with the teeth of the fly-wheel gear by sliding across the teeth thereof and advancing to full meshed position. The clutch at this, the second stage, should come into action with a gradually increasing rate of friction until it will hold the stall-torque of the motor, which on the Ford car is about sixteen foot pounds. The capacity of this clutch is designed to hold about 10% more than the stall-torque of the motor, so that the clutch will slip when the instantaneous torque exceeds this amount, such, for example, as would occur on a backfire or in picking up the load in getting the engine started and when the inertia of the armature is added to the stall-torque capacity.

Another feature of this invention is that a heavy bumper spring is not required on account of the soft action of the clutch and the only spring required is a light anti-rattler spring 30 which prevents the pinion from jarring along the shaft and chattering along the fly-wheel, due to vibration.

It is obvious that the angle of the cam path can be changed and if it is reduced the initial friction between the hub 15 and sleeve 22 can be reduced. There are some applications of this clutch where it is desirable to reduce the angle of the cam to a point where a very slight friction indeed is required to make it self-energizing.

If desired, the relative location of the outer sleeve 22 to the shoulder 16 of the hub 15 when the pinion 12 is out of engagement with the gear 13 may be as illustrated in Fig. 5, wherein the left hand end of the outer sleeve 22 is shown spaced apart from the shoulder 16. The object of this relative location of the parts 22 and 15 is to provide a yielding or cushioning action in the clutch whereby when the teeth of the pinion 12 abut against the teeth of the gear 13, the outer sleeve 22 will move longitudinally of the hub 15 until its left end engages the shoulder 16. Since the outer sleeve 22 has frictional engagement with the hub 15, this sliding of the outer sleeve along the hub will eliminate any shock that might occur if the outer sleeve abutted against the shoulder 16 when the teeth of the pinion first butted against the teeth of the gear. This yielding of the outer sleeve relatively to the hub 15 might also occur when the inner sleeve 20 engaged the shoulder 28 on the shaft 11, thus imparting a cushioning effect to the clutch when the pinion is in full mesh with the gear. When the pinion is thrown out of engagement with the gear as hereinbefore described, and just prior to its arriving at the position illustrated in Fig. 1, the outer sleeve 22 will be moved away from engagement with the shoulder 16 by the engagement of the edge 31′ of the cam with the studs 26, and this will also impart a cushioning effect which will prevent rebound of the outer sleeve 22 and pinion 12.

I claim:

1. An engine drive mechanism having, in combination, a driving shaft, a driven member embodying a gear, a pinion slidable longitudinally on said shaft into engagement with said gear and embodying therein a hub split longitudinally thereof, a sleeve on said hub and clutched thereto by frictional engagement, and means actuated by the rotation of said shaft for sliding said pinion along the shaft and into engagement with the gear.

2. An engine drive mechanism having, in combination, a driving shaft, a driven member embodying a gear, a pinion slidable longitudinally on said shaft into engagement with said gear and embodying therein a hub split longitudinally thereof, a sleeve on said hub and clutched thereto by frictional engagement of predetermined capacity, and means actuated by the rotation of said shaft for sliding said pinion along the shaft and into engagement with the gear.

3. An engine drive mechanism having, in combination, a driving shaft, a driven member embodying a gear, a pinion slidable longitudinally on said shaft into engagement with said gear and embodying therein a hub split longitudinally thereof, a sleeve on said hub and clutched thereto by frictional engagement, and a lateral projection on said shaft engaging a cam on said sleeve, whereby said pinion may be slid along said shaft and into engagement with said gear.

4. An engine drive mechanism having, in combination, a driving shaft, a driven member embodying a gear, a pinion slidable longitudinally on said shaft into engagement with said gear and embodying therein a hub split longitudinally thereof, a sleeve on said hub, and means to increase the pressure of said hub against said sleeve when said pinion is moved into mesh with said gear.

5. An engine drive mechanism having, in combination, a driving shaft, a driven member embodying a gear, a pinion slidable longitudinally on said shaft into engagement with said gear and embodying therein a hub split longitudinally thereof, an outer sleeve surrounding said hub and clutched thereto by frictional engagement, a flange on said hub adapted to be engaged by one end of said sleeve, and means actuated by the rotation of said shaft for sliding said pinion along the shaft and into engagement with the gear.

6. An engine drive mechanism having, in combination, a driving shaft, a driven member embodying a gear, a pinion slidable longitudinally on said shaft into engagement with said gear and embodying therein a hub split longitudinally thereof, an outer sleeve surrounding said hub, means actuated by the rotation of said shaft for sliding said outer sleeve and pinion along the shaft, and means to increase the pressure of said hub against said outer sleeve when said pinion is moved into mesh with said gear.

7. An engine drive mechanism having, in combination, a driving shaft, a driven member embodying a gear, a pinion slidable longitudinally on said shaft into engagement with said gear and embodying therein a hub split longitudinally thereof, an outer sleeve surrounding said hub, means actuated by the rotation of said shaft for sliding said outer sleeve and pinion along the shaft, and means to increase the pressure of said hub against said outer sleeve when said pinion is moved into mesh with said gear and to decrease said pressure when the pinion is moved out of mesh with said gear.

8. An engine drive mechanism having, in combination, a driving shaft, a driven member embodying a gear, a pinion slidable longitudinally on said shaft into engagement with said gear and embodying therein a hub split longitudinally thereof, an outer sleeve surrounding said hub, a shoulder on said hub adapted to be engaged by one end of said sleeve, means actuated by the rotation of said shaft for sliding said outer sleeve and pinion along the shaft, and means to increase the pressure of said hub against said outer sleeve when said pinion is moved into mesh with said gear.

9. An engine drive mechanism having, in combination, a driving shaft, a driven member embodying a gear, a pinion slidable longitudinally on said shaft into engagement with said gear and embodying therein a hub split longitudinally thereof, an outer sleeve surrounding said hub, an inner sleeve on said shaft within said hub and constituting a wedge, means actuated by said shaft for sliding said outer sleeve, pinion and inner sleeve along the shaft, and a stop on said shaft adapted to be engaged by said inner sleeve to stop its longitudinal motion when it arrives at a predetermined position longitudinally of said shaft, whereby the frictional clutching engagement of the hub with said outer sleeve will be increased.

10. An engine drive mechanism having, in combination, a driving shaft, a driven member embodying a gear, a pinion slidable longitudinally on said shaft into engagement with said gear and embodying therein a hub split longitudinally thereof, an outer sleeve surrounding said hub, an inner sleeve on said shaft within said hub and constituting a wedge, means actuated by said shaft for sliding said outer sleeve, pinion and inner sleeve along the shaft, a shoulder on said shaft adapted to be engaged by said inner sleeve to stop its longitudinal motion when it arrives at a predetermined position longitudinally of said shaft, whereby the frictional clutching engagement of the hub with the outer sleeve will be increased, and a spring interposed between said inner sleeve and shoulder.

11. An engine drive mechanism having, in combination, a driving shaft, a driven member embodying a gear, a pinion slidable longitudinally on said shaft into engagement with said gear and embodying therein a hub split longitudinally thereof and having a tapered bore, an outer sleeve surrounding said hub, a tapered inner sleeve on said shaft within said hub adapted to engage the tapered bore of said hub, means actuated by said shaft for sliding said outer sleeve, pinion and inner sleeve along the shaft, and a shoulder on said shaft adapted to be engaged by said inner sleeve to stop its longitudinal motion when it arrives at a predetermined position longitudinally of said shaft, whereby the frictional clutching engagement of the hub with the outer sleeve will be increased.

12. A friction clutch having, in combination, a cylindrical member split longitudinally thereof for a portion of its length, an outer sleeve surrounding said split portion, and an inner sleeve constituting a wedge positioned within said split portion.

13. A friction clutch having, in combination, a cylindrical member split longitudinally thereof for a portion of its length, an outer sleeve surrounding said split portion, and an inner sleeve constituting a wedge positioned within said split portion, said outer sleeve and the split portion of said cylindrical member being normally clutched together by frictional engagement of predetermined capacity.

14. A friction clutch having, in combination, a cylindrical member split longitudinally thereof for a portion of its length, an outer sleeve surrounding said split portion, an inner sleeve constituting a wedge positioned within said split portion, said outer sleeve and the split portion of said cylindrical member being normally clutched together by frictional engagement of predetermined capacity, means to move said outer sleeve and cylindrical member longitudinally of said inner sleeve, whereby the frictional capacity of the split portion of said cylindrical member against said outer sleeve may be increased.

15. A friction clutch having, in combination, a cylindrical member split longitudinally thereof for a portion of its length, a shoulder on the periphery of said cylindrical member, an outer sleeve surrounding said split portion of said cylindrical member and bearing against said shoulder, and a tapered inner sleeve positioned within a tapered bore provided in said cylindrical member.

16. An engine drive mechanism having, in combination, a driving shaft, a driven member embodying a gear, a pinion slidable longitudinally on said shaft into engagement with said gear and embodying therein a hub split longitudinally thereof, an outer sleeve surrounding said hub, a shoulder on said hub adapted to be engaged by one end of said sleeve, but normally spaced apart therefrom, means actuated by the rotation of said shaft for sliding said outer sleeve and pinion along the shaft and for sliding said outer sleeve along said hub, and means to increase the pressure of said hub against said outer sleeve when said pinion is moved into mesh with said gear.

In testimony whereof I have hereunto set my hand.

ROLLIN ABELL.